United States Patent [19]
Jensen et al.

[11] Patent Number: 5,975,215
[45] Date of Patent: Nov. 2, 1999

[54] MEANS FOR CONTROLLING THE STROKE OF A HYDRAULIC CYLINDER

[75] Inventors: Layton W. Jensen; William A. Bachman, both of Thurston, Nebr.

[73] Assignee: Thurston Mfg. Co., Thurston, Nebr.

[21] Appl. No.: 09/234,217

[22] Filed: Jan. 20, 1999

[51] Int. Cl.⁶ .................................................. A01B 63/22
[52] U.S. Cl. .......................................... 172/407; 172/423
[58] Field of Search .................................... 172/459, 452, 172/640, 744, 460, 474, 407, 423

[56] References Cited

U.S. PATENT DOCUMENTS

| | | | |
|---|---|---|---|
| 2,914,125 | 11/1959 | Tanke et al. | 172/423 X |
| 2,967,725 | 1/1961 | Roberson | 172/452 X |
| 3,993,413 | 11/1976 | Cox et al. | 172/452 X |
| 4,189,009 | 2/1980 | Welch | 172/459 X |
| 4,967,851 | 11/1990 | Barber | 172/459 X |
| 5,086,847 | 2/1992 | Meiners | 172/423 X |
| 5,143,160 | 9/1992 | May | 172/452 X |
| 5,234,060 | 8/1993 | Carter | 172/407 X |
| 5,641,026 | 6/1997 | Balmer | 172/452 |

*Primary Examiner*—Christopher J. Novosad
*Attorney, Agent, or Firm*—Zarley, McKee, Thomte, Voorhees & Sease; Dennis L. Thomte

[57] ABSTRACT

Structure for controlling the stroke of a hydraulic cylinder, especially where the hydraulic cylinder is utilized on farm implements where field operation height control is necessary. The farm implement includes a frame having at least a wheel support pivotally secured thereto which supports a ground-engaging wheel thereon. A hydraulic cylinder is operatively connected to the frame and to the wheel support whereby extension of the hydraulic cylinder causes the frame to be raised relative to the ground and whereby retraction of the hydraulic cylinder causes the frame to be lowered with respect to the ground. An adjustable valve support is positioned in the pivotal path of the hydraulic cylinder and supports a valve thereon having a plunger extending therefrom which controls the operation of the valve. An actuator is movably positioned on the hydraulic cylinder and is adapted to engage the plunger of the valve to close the normally open valve upon predetermined movement of the hydraulic cylinder. The closing of the valve by the actuator moving with the hydraulic cylinder discontinues the flow of hydraulic fluid to the cylinder thereby limiting the stroke of the cylinder.

20 Claims, 7 Drawing Sheets

MEANS FOR CONTROLLING THE STROKE OF A HYDRAULIC CYLINDER

BACKGROUND OF THE INVENTION

1. Field of the Invention

This invention relates to a means for controlling the stroke of a hydraulic cylinder and more particularly to a means for controlling the stroke of a hydraulic cylinder utilized on farm implements where field operation height control is necessary for effective and consistent results.

2. Description of the Related Art

The field operation height control of farm implements is necessary for effective and consistent results, particularly when the machinery must be raised and lowered on a regular basis to allow for turning at the end of a field. In the past, depth control devices have been provided, such as cylinder shaft stop segments, that are physically mounted onto the cylinder shafts. However, the mounting of the cylinder shaft stop segments onto the cylinder shafts requires that the operator actually position himself/herself adjacent the hydraulic cylinder, even though the location may be difficult to reach and may be in a hazardous location. Further, the positioning of the cylinder shaft stop segments on the shafts can sometimes damage the cylinder shafts. Additionally, other types of hydraulic stroke depth control devices have been utilized, such as button stops, but the same are not easily mounted on the implement nor are they easy to adjust.

SUMMARY OF THE INVENTION

A means for controlling the stroke of a hydraulic cylinder is disclosed with the means being particularly well-suited for controlling the stroke of a hydraulic cylinder utilized on a farm implement to control the field operation height of the implement and the earth-working tools mounted thereon. Although the invention is particularly well-suited for use as a depth control for tillage equipment, the apparatus of this invention will work in any situation wherein it is desired to control the stroke of a hydraulic cylinder.

In the instant invention, the farm implement is hitched to a tractor which includes a hydraulic system having first and second hydraulic fluid ports associated therewith wherein one of the ports serves as a discharge port while the other port serves as a return port and vice versa. The tractor hydraulic system includes a fluid pressure sensing means which senses pressure in a predetermined first or second port for discontinuing the flow of hydraulic fluid from that port when a predetermined amount of pressure is sensed.

The implement frame is supported by a pair of ground-engaging wheels which are pivotally secured to the frame to control the height of the frame relative to the ground. Although a pair of ground-engaging wheels is shown and described, any number of ground-engaging wheels could be utilized, if so desired. Each of the ground-engaging wheels includes an elongated arm which is pivoted at its upper end to the frame and which extends downwardly and forwardly with respect to the frame. A wheel is rotatably mounted on the lower end of the elongated arm. The cylinder shaft of a hydraulic cylinder is operatively connected to the lower end of the elongated arm and has the upper end of the cylinder body thereof pivotally connected to the frame. A depth control mechanism is provided on one of the hydraulic cylinders with the other hydraulic cylinder being fluidly operated in series with the hydraulic cylinder having the depth control mechanism thereon.

A valve support plate is pivotally mounted on the pivotal connection between the upper end of the hydraulic cylinder and the frame and is selectively pivotally moved by means of a linkage which extends to the front of the implement for convenient adjustment by the operator. A normally open valve is positioned on the valve support plate and has a plunger or stem extending downwardly and forwardly therefrom with the plunger being connected to a valve member within the valve body which is positioned between upper and lower fluid ports on the valve body. A valve actuator is mounted on a plate-like support which is also pivotally connected to the pivotal connection of the hydraulic cylinder and the frame. The plate-like support for the actuator is movable with the hydraulic cylinder and the actuator is adapted to engage the plunger of the valve to close the valve member thereof upon a predetermined amount of retraction of the hydraulic cylinder. When the valve is closed by the actuator, the fluid pressure within the hydraulic cylinder below the piston thereof increases, with the increase in pressure being sensed by the tractor hydraulic system which discontinues the flow of hydraulic fluid to the lower end of the hydraulic cylinder. The closing of the valve by the actuator, which halts the further retraction of the cylinder shaft, effectively limits the lowering of the frame with respect to the ground, thereby serving as a depth control mechanism for the earth-working tools on the implement.

The actuator is spring-loaded so that the valve plunger, upon a sufficient amount of pressure being applied to the valve member of the valve by the tractor hydraulic system, will move outwardly from the valve body against the resiliency of the spring-mounting of the actuator to permit the valve member to open.

It is therefore a principal object of the invention to provide a means for controlling the stroke of a hydraulic cylinder.

Still another object of the invention is to provide a means for controlling the stroke of a hydraulic cylinder which does not require cylinder shaft stop segments being installed on the cylinder shaft.

Still another object of the invention is a means for controlling the stroke of a hydraulic cylinder to control field operation height of a farm implement.

Still another object of the invention is to provide a means for controlling the stroke of a hydraulic cylinder wherein the adjustment means thereof is located remote from the cylinder.

Yet another object of the invention is to provide a means for controlling the stroke of a hydraulic cylinder which is easily adjusted.

These and other objects will be obvious to those skilled in the art.

DESCRIPTION OF THE PREFERRED EMBODIMENT

The numeral 10 refers to an agricultural implement, such as the tillage device manufactured by Thurston Manufacturing Company of Thurston, Nebr., under the trademark TILLAGEPRO, which includes a frame having gangs of discs, ripping or tilling shanks, etc., mounted thereon. The invention to be described hereinafter is particularly well-suited for use with the TILLAGEPRO implement and is well-suited for use with any tillage implement requiring tillage depth control. Further, the invention described herein is also well-suited for hydraulic cylinder stroke control in general.

Figure 6:
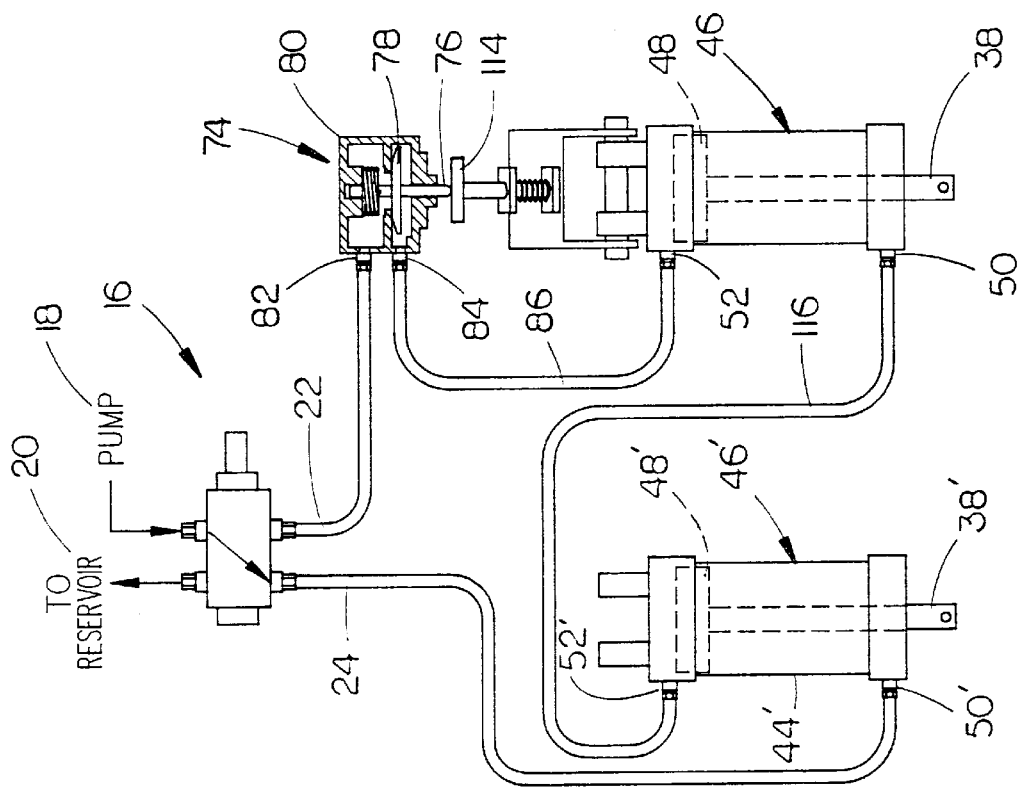
FIG. 6 is a schematic view illustrating the circuitry of the invention when the stroke control hydraulic cylinder is in its extended position.
Figure 7:
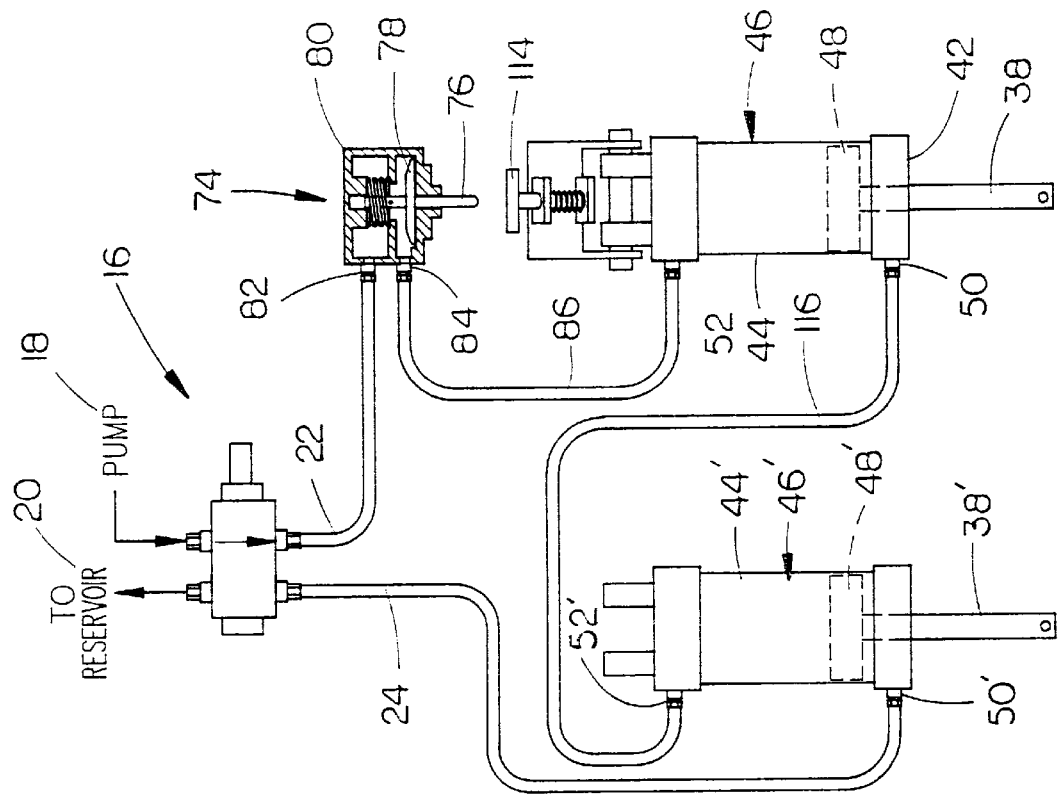
FIG. 7 is a view similar to FIG. 6 except that the depth control hydraulic cylinder has been retracted.

In most tillage implements requiring depth control, the implement will include at least one horizontally disposed, transversely extending frame member or tool bar 12 having earth-working tools such as discs, shanks or the like conventionally mounted thereon. A tongue 14 extends forwardly from the implement for connection to a tractor having a conventional hydraulic system 16 (FIGS. 6–7). The system 16 includes a pump 18, reservoir 20, hydraulic lines 22 and 24, each of which may serve as a fluid output line or a fluid return line. The system 16 includes a conventional pressure sensing valve associated with at least line 24 which senses a pressure of a predetermined amount therein and which then closes to prevent further hydraulic fluid being pumped to the associated hydraulic cylinder. Although the invention disclosed herein is designed to discontinue the flow of hydraulic fluid to a retracting cylinder, the flow of hydraulic fluid to an extending cylinder could also be discontinued, if desired.

The upper end of arm 32 is pivotally secured to frame member 12 and extends downwardly and forwardly therefrom. Arm 32 has its lower end secured to the spindle 34 of the wheel 28 by any suitable means. Cylinder rod bracket 36 is welded to the lower forward end of arm 32 and has the lower end of a cylinder shaft 38 pivotally secured thereto by pin 40. Although it has been described and shown that arm 32 extends downwardly and forwardly from frame member 12, which is the preferred embodiment, arm 32 could extend downwardly and rearwardly from frame member 12, if so desired.

Cylinder shaft 38 slidably extends from the lower end 42 of cylinder body 44 of hydraulic cylinder 46 and has a conventional piston 48 mounted on its upper end. Cylinder body 44 is provided with a fluid port 50 at its lower end and a fluid port 52 at its upper end which communicate with the interior of cylinder body 44 below and above the piston 44, respectively, in conventional fashion.

A pair of spaced-apart plates 54 and 56 are secured to the upper end of cylinder body 44 and have openings formed therein adapted to receive a shaft 58 extending therethrough, as will be described hereinafter. Plates 54 and 56 are positioned on the opposite sides of bracket 60 which is welded to frame member 12 and which has an opening formed therein which receives the shaft 58 extending therethrough.

Figure 3:
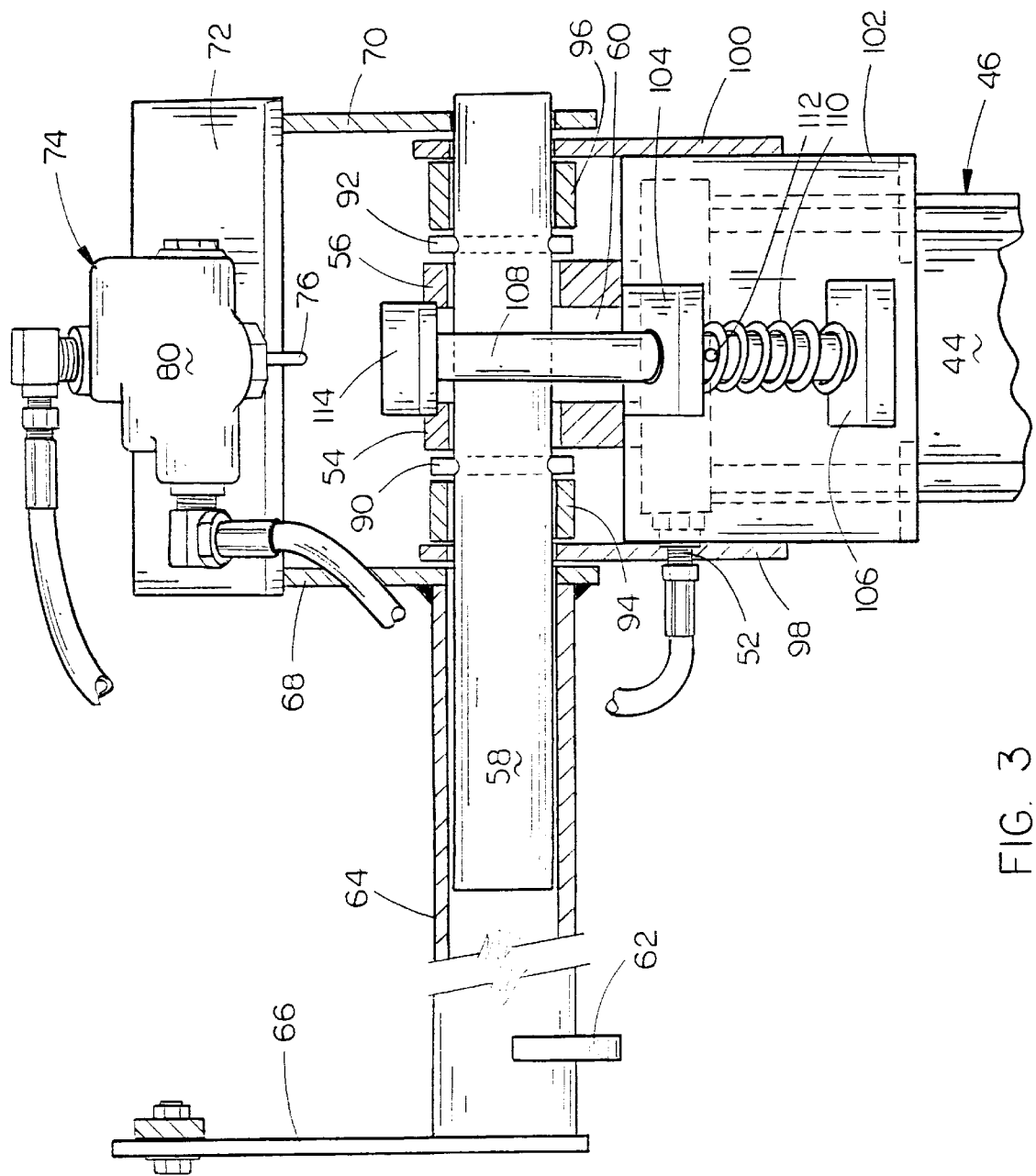
FIG. 3 is a partial sectional view.
Figure 5:
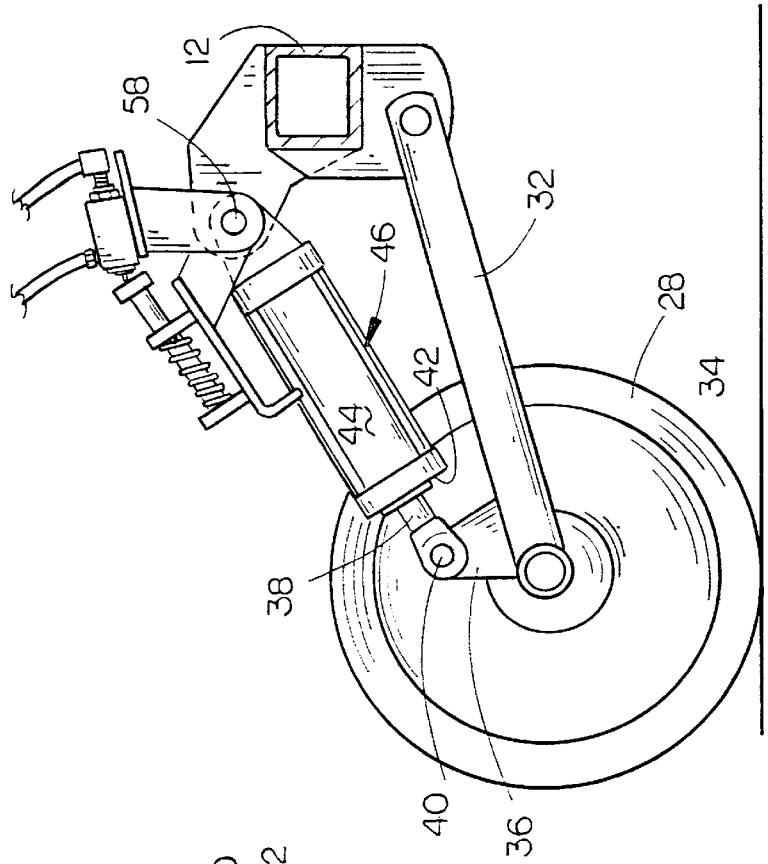
FIG. 5 is a view similar to FIG. 4 except that the depth control cylinder has been retracted to lower the implement frame.

The numeral 62 refers to a support which is welded to the framework of the implement laterally of shaft 58 and has a U-shaped notch formed in its upper end which rotatably receives and supports the transversely extending hollow tube 64 positioned therein. Upright 66 is welded to the inner end of tube 64 and extends upwardly therefrom. As seen in FIG. 3, the outer end of tube 64 rotatably receives one end of shaft 58 therein. A flat arm 68 is welded to the outer end of tube 64 and extends upwardly therefrom. A flat arm 70 has an opening formed therein which receives the end of shaft 58 and extends upwardly therefrom in an aligned relationship with arm 68. Valve support plate 72 is welded to the upper ends of arms 68 and 70 and extends therebetween. A normally open button valve 74 is mounted on plate 72 and has a valve stem or plunger 76 extending therefrom which is connected to the valve member 78 in valve 74. When plunger 76 is moved inwardly into the valve body 80, the valve member 78 is moved to its closed position, as seen in FIG. 7. When the plunger 76 is in its fully extended position, valve member 78 is open, as seen in FIG. 6. Valve 74 includes fluid ports 82 and 84 communicating with opposite sides of valve member 78. Hydraulic lines 22 and 86 are fluidly connected to ports 82 and 84, respectively.

Cotter keys 90 and 92 extend through shaft 58 on opposite sides of plates 54 and 56, as seen in FIG. 3. Tubular spacers 94 and 96 are loosely positioned on shaft 58 inwardly and outwardly of keys 90 and 92, respectively, as seen in FIG. 3.

Plate-like arms 98 and 100 have their rearward ends rotatably mounted on shaft 58 inwardly and outwardly of spacers 94 and 96, respectively, and have a support plate 102 secured to the forward ends thereof and which extends therebetween. Upper and lower ears or brackets 104 and 106 are welded to the forward face of plate 102 and have an actuator rod or shaft 108 freely movably extending therethrough. Spring 110 embraces rod 108 between ears 104 and 106 with its upper end engaging the bottom of a pin 112 which extends transversely through rod 108 below ear 104. The upper end of rod 108 has a flat actuator plate 114 mounted thereon which is adapted to engage plunger 76, to close valve member 78 of valve 74, when cylinder shaft 38 is retracted a predetermined amount, as will be discussed hereinbelow.

As seen in FIGS. 6 and 7, hydraulic line 116 extends from port 50 of hydraulic cylinder 46 to port 52' provided at the upper end of hydraulic cylinder 46' if two control cylinders are utilized. Hydraulic line 24 is fluidly connected to port 50', as seen in FIG. 6.

Figure 4:
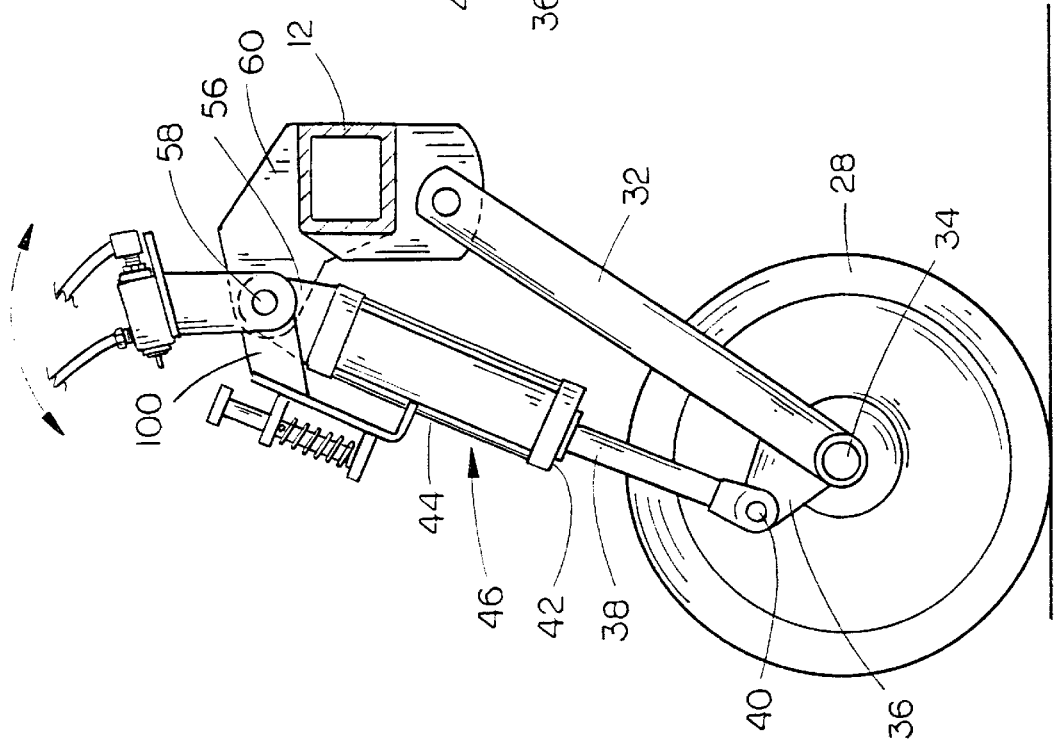
FIG. 4 is a side view illustrating the depth control hydraulic cylinder in its extended position.

Assuming that the hydraulic cylinders 46 and 46' are in their fully extended positions, as illustrated in FIG. 6, the frame 12 is in its uppermost position with respect to the ground, as illustrated in FIG. 4. Hydraulic cylinder 46 is extended by hydraulic fluid being pumped from pump 18, through line 22, through valve 74, which is open, through line 86 and into the upper end of cylinder 46 by means of the port 52. As the piston 48 moves downwardly in the cylinder body 44, hydraulic fluid is forced outwardly from cylinder body 44 through the port 50, through line 116, and into the upper end of the cylinder 46', thereby causing piston 48' to be moved downwardly in cylinder body 44' so that cylinder shaft 38' is extended. Return flow to the reservoir 20 is provided by means of the line 24. Thus, extension of the cylinder shafts 38 and 38' causes the frame 12 to be raised with respect to the ground.

When it is desired to lower the implement so that the earth-working tools are lowered to a predetermined depth, as will be described hereinafter, hydraulic fluid is pumped from the pump 18, through line 24, into the lower end of hydraulic cylinder 46' which causes the cylinder shaft 3' to retract as the piston 48' moves upwardly in cylinder body 44' of cylinder 46'. As the piston 48' moves upwardly, hydraulic fluid is forced outwardly from the upper end of the cylinder 46', through line 116, and into the lower end of hydraulic cylinder 46 so that piston 48 is moved upwardly in cylinder 46 simultaneously with the upward movement of the piston 48' in cylinder 46'. As the cylinder shaft 38' retracts, the hydraulic fluid in the cylinder 46 above piston 48 flows outwardly through port 52, through line 86, and into valve 74 by means of the port 84. The hydraulic fluid continues to pass through valve 74 inasmuch as the valve member 78 is in its open position. Valve member 78 remains open until the plate 114 on actuator 108 engages plunger 76 and sufficiently moves the same inwardly into the valve body 80 to close valve member 78. When valve member 78 is moved to its closed position by the engagement of the actuator 108 with the plunger 76, no further hydraulic fluid is permitted to pass through the valve 74. Inasmuch as no further hydraulic fluid can pass through valve 74 when the valve member 78 is in its closed position, an increase in hydraulic fluid pressure is experienced in hydraulic cylinder 46' inasmuch as piston 4' can no longer move upwardly. The increase in hydraulic fluid pressure within cylinder body 44 is also present in line 24 which is sensed by the sensing means in the hydraulic system of the tractor which then discontinues further fluid flow through line 24. When the fluid flow through line 24 is discontinued, which occurs simultaneously with the closing of valve member 78, the traction of cylinder shafts 38 and 38' is discontinued, which results in the frame 12 being positioned in a vertically stable position.

Figure 2:
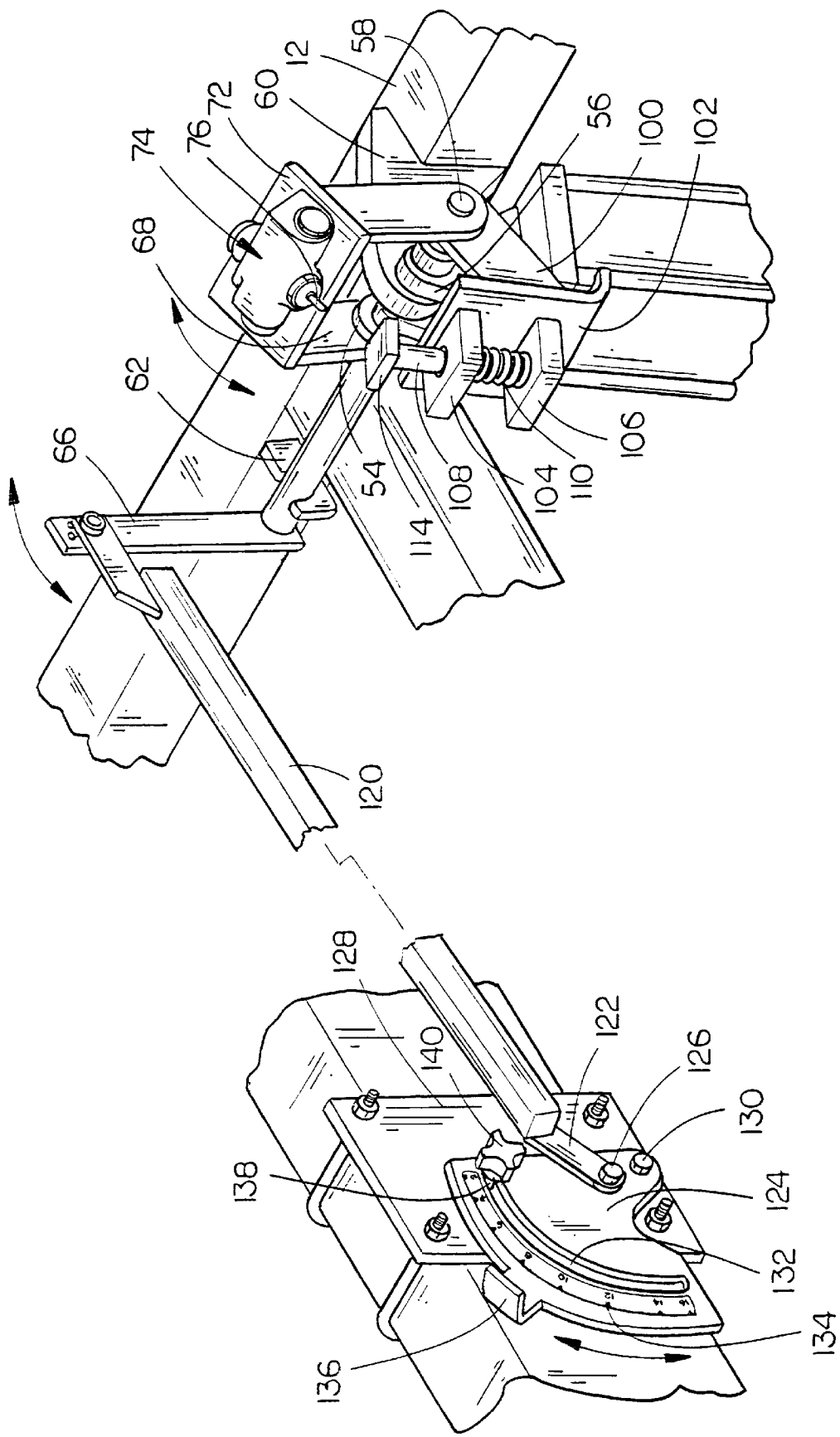
FIG. 2 is a partial perspective view of the means of this invention.

When it is desired to raise the frame 12 and the earthworking implements thereon, hydraulic fluid is pumped to the upper end of the valve 74 through the line 22 by the tractor hydraulic system. As hydraulic fluid is being pumped into the upper end of the valve 74, above valve member 78, fluid pressure within the upper end of valve member 74 increases until sufficient force is present to permit the valve member 78 to move downwardly from its closed position to an open position against the resistance of the spring 110. It would be impossible to open valve member 78 if the actuator 108 was not spring-loaded to permit the actuator 108 to move downwardly as valve member 78 is moved to its open position. When valve member 78 is opened, hydraulic fluid is delivered to the upper end of the hydraulic cylinder 46 and to the upper end of the hydraulic cylinder 46' to cause the cylinder shaft 38 and 38' to extend to raise the frame 12 and the implements thereon. A novel means is also described for adjusting the position of the valve support 72, and hence the valve 80, so that the stroke of the hydraulic cylinder 46, and hydraulic cylinder 46', may be adjusted. As seen in FIG. 2, an elongated tube 120 is adjustably secured as rearward end to the upper end of the upright 66. The forward end of tube 120 has a short arm 122 secured thereto which is pivotally secured to an adjustment plate 124 by means of bolt assembly 126. Adjustment plate 124 is pivotally secured to a bracket 128 by means of bolt assembly 130. Adjustment plate 124 is provided with an arcuate slot 132 formed therein having depth indicia 134 positioned adjacent thereto. Handle 136 is also provided at the upper end of the adjustment plate 124. A threaded bolt 138 is secured to bracket 128 and extends outwardly through the arcuate slot 132 and has an adjustment knob 140 threadably mounted thereon which is designed to be loosened so that adjustment plate 132 may be pivoted about bolt assembly 130 and so that the knob 140 may be tightened to move into frictional engagement with the plate 124 to position plate 124 in its desired position.

Figure 1:
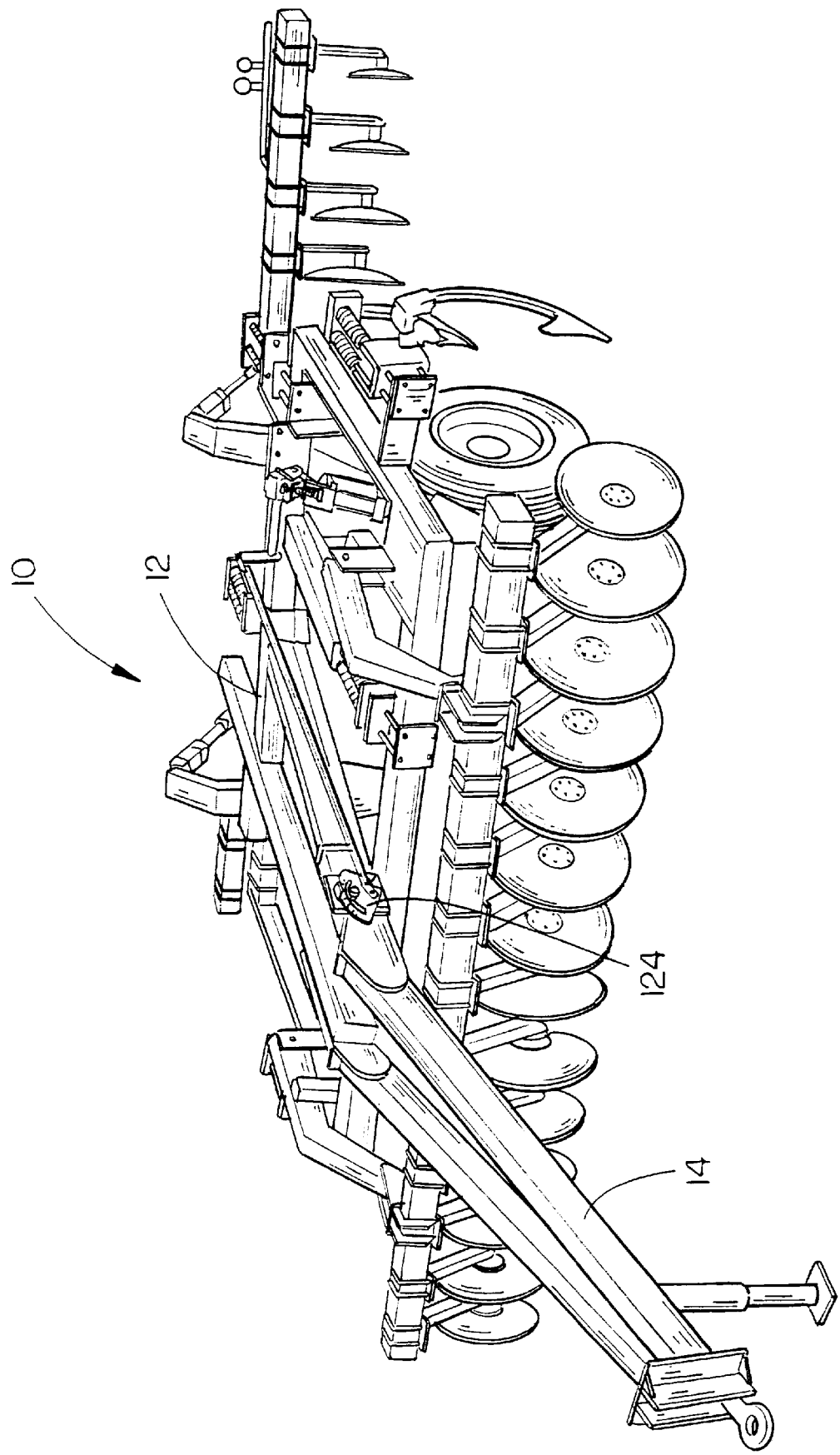
FIG. 1 is a front perspective view of a farm implement having the means of this invention mounted thereon.

Thus, the position of the upright 66 may be selectively varied through the pivotal movement of the adjustment plate 124 with respect to the bolt assembly 130 and held in place by the adjustment knob 140. Selective rearward movement of the tube 120 causes the upright 66 to be moved in a clockwise direction, as viewed in FIG. 2. The rearward movement of the upper end of upright 66 causes shaft 64 to be rotated in a clockwise direction, as viewed in FIG. 2, which causes the support plate 72 to be pivotally moved rearwardly which, in effect, increases the distance between the outer end of the plunger 76 and the plate 114 of actuator 108 which means that the hydraulic cylinder 46 has to be further retracted before plate 114 will engage plunger 76 to close valve member 78. It can therefore be seen that the selective positioning of the plate 124 enables the operator to adjust the depth control, by controlling the retraction of the cylinder shaft, in a convenient manner with the adjustment being able to be made at a position remote from the hydraulic cylinder. The remote adjustment of the depth control of the cylinder is convenient and does not place the operator in a hazardous position, since the adjustment plate 124 is located adjacent the forward end of the implement, as illustrated in FIG. 1.

Figure 8:
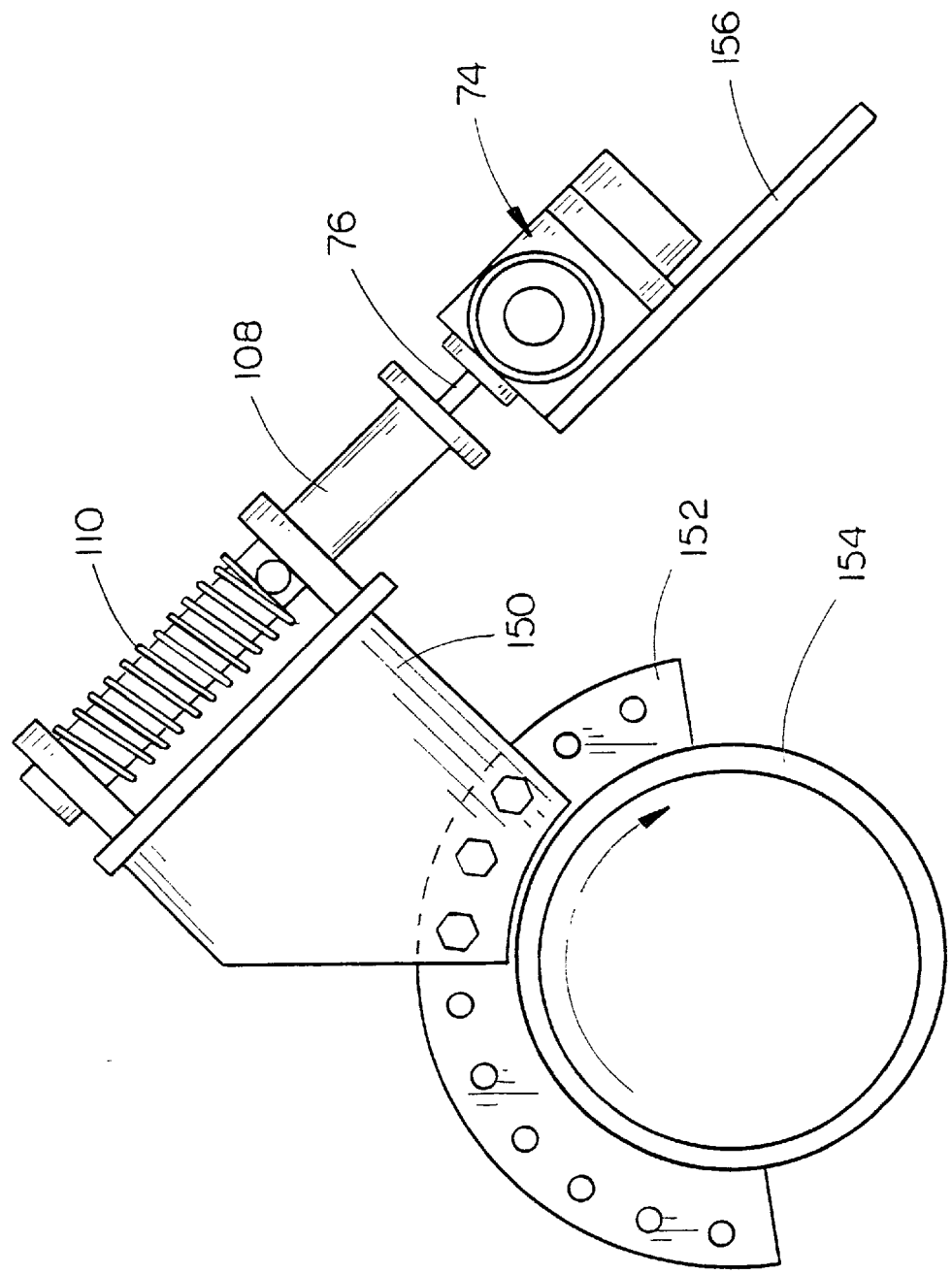
FIG. 8 is a side view illustrating a further embodiment of the means for controlling the stroke of a hydraulic cylinder.
Figure 9:
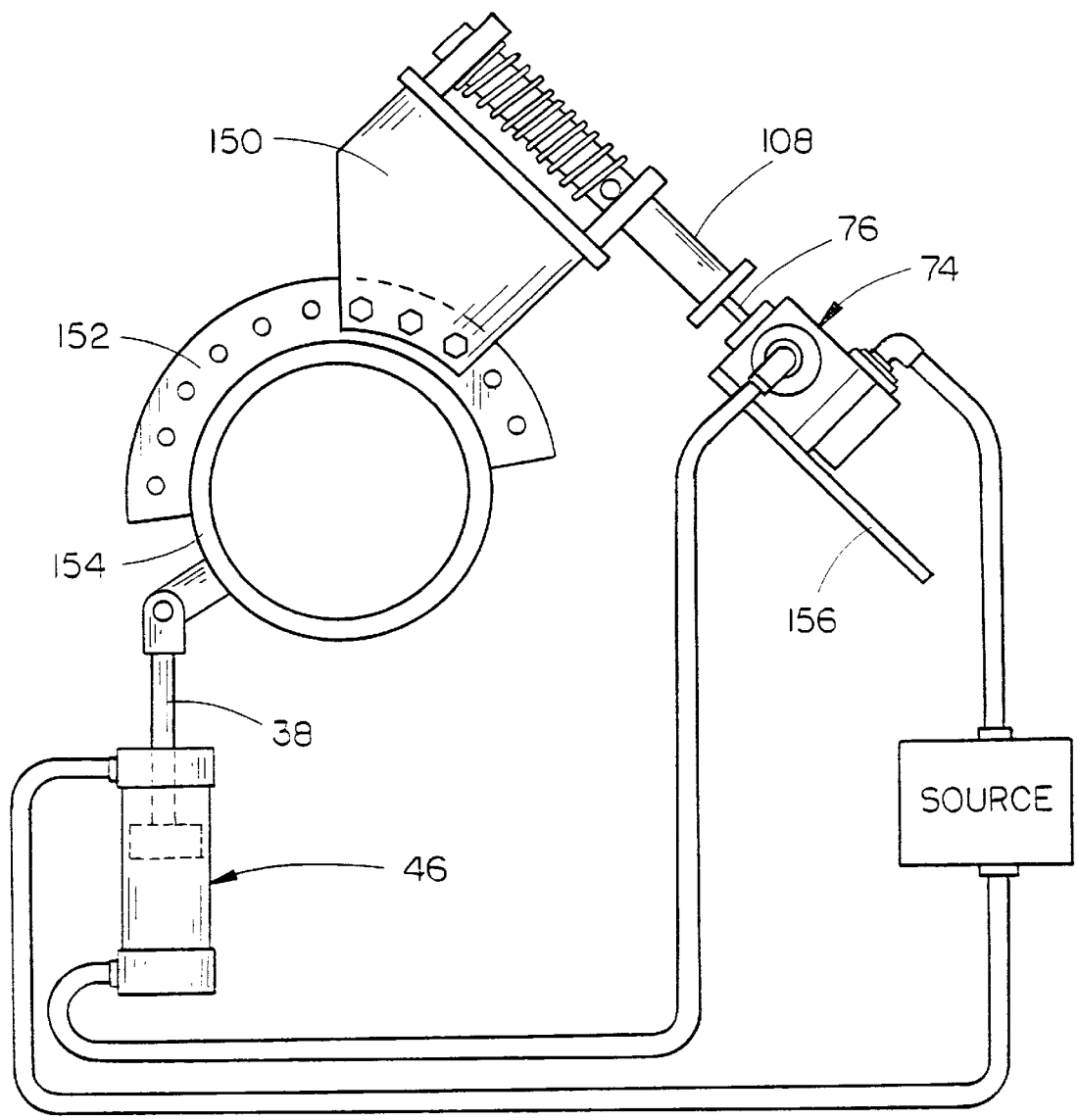
FIG. 9 is a schematic of the embodiment of FIG. 8.

FIG. 8 illustrates a further embodiment which is somewhat different than that previously described, although the same valving is utilizing in FIGS. 8 and 9. While FIGS. 1–7 illustrate that the actuator is operatively positioned on the upper end of the hydraulic cylinder, FIGS. 8 and 9 illustrate the actuator 108 being mounted on a bracket 150 which is adjustably secured to a ring-like segment 152 which is secured to a tube 154, whose clockwise direction of rotation is to be controlled. Tube 154 would be operatively connected in some fashion to the cylinder shaft 38 of the hydraulic cylinder 46 or to the body of the cylinder 46 so that tube 154 is rotated with movement of the cylinder 46. Valve 74 is secured to the frame upon which the tube 154 is mounted by means of the bracket 156. Assuming that it is desired to control the clockwise rotation of tube 154, as illustrated in FIGS. 8 and 9, the normally open valve 74 will permit fluid flow therethrough to one end of the hydraulic cylinder 46 which will cause tube 154 to be rotated in a clockwise direction. The tube 154 will continue to rotate in a clockwise direction upon the extension of the cylinder shaft 38 until the actuator 108, which is moving with tube 154, engages the plunger 76 to close the valve member in the valve 74 at which time fluid flow will be discontinued to hydraulic cylinder 46. The relationship of the bracket 150 with respect to the tube 154 is easily changed by repositioning the bracket 150 with respect to the segment 152.

Thus it can be seen that the invention accomplishes at least all of its stated objectives.

We claim:

1. In combination with a tractor including a hydraulic system having first and second fluid ports, a fluid pump for selectively pumping hydraulic fluid from said first port so that said first port functions as a fluid discharge port while said second port functions as a fluid return port, or vice versa, and a fluid pressure sensing means for sensing fluid pressure in said first port for discontinuing the flow of hydraulic fluid from said first port, comprising:

a farm implement hitched to the tractor;

said farm implement including a frame having rearward and forward ends and having at least first and second spaced-apart wheel support assemblies mounted thereon for raising and lowering said frame relative to the ground;

said first wheel support assembly comprising a first support arm having an upper end pivotally secured to said frame about a horizontal axis and a lower end which supports a first ground-engaging wheel thereon;

a first hydraulic cylinder including a first cylinder body having upper and lower ends, a first piston slidably positioned within said first cylinder body, and a first cylinder shaft secured to said first piston and slidably extending from said cylinder body;

said upper end of said first cylinder body of said first hydraulic cylinder being pivotally secured to said frame;

said first support arm extending downwardly and forwardly from said frame;

said first hydraulic cylinder extending downwardly and forwardly from said frame;

said first cylinder shaft of said first hydraulic cylinder being operatively connected to said first support arm whereby extension of said first cylinder shaft causes said frame to be raised with respect to the ground and whereby retraction of said first cylinder shaft causes said frame to be lowered with respect to the ground;

said first hydraulic cylinder body having an upper fluid port provided therein above said first piston and a lower fluid port provided therein below said first piston;

said second wheel support assembly comprising a second support arm having an upper end pivotally secured to said frame about a horizontal axis and a lower end which supports a second ground-engaging wheel thereon;

a second hydraulic cylinder including a second cylinder body having upper and lower ends, a second piston slidably positioned within said second cylinder body, and a second cylinder shaft secured to said second piston and slidably extending from said second cylinder body;

said upper end of said second cylinder body being pivotally secured to said frame;

said second support arm extending downwardly and forwardly from said frame;

said second hydraulic cylinder extending downwardly and forwardly from said frame;

said second cylinder shaft being operatively connected to said second support arm whereby extension of said second cylinder shaft causes said frame to be raised with respect to the ground and whereby retraction of said second cylinder shaft causes said frame to be lowered with respect to the ground;

said second hydraulic cylinder body having an upper fluid port provided therein above said second piston and a lower fluid port provided therein below said second piston;

a valve support positioned above said first cylinder body;

a valve mounted on said valve support and having a normally open valve member positioned therein between first and second fluid ports;

said valve member having a plunger secured thereto which extends from said valve;

a first hydraulic conduit extending between said first port of said tractor hydraulic system to said lower port of said second hydraulic cylinder;

a second hydraulic conduit extending between second port of said tractor hydraulic system and said first fluid port of said valve;

a third hydraulic conduit extending between said second fluid port of said valve and said upper port of said first hydraulic cylinder;

a fourth hydraulic conduit extending between said lower port of said first hydraulic cylinder and said upper port of said second hydraulic cylinder;

and an actuator at said upper end of said first hydraulic cylinder and being movable therewith for engagement with said plunger of said valve so that said actuator will engage said plunger to close said valve member upon a predetermined amount of retraction of said first cylinder shaft and a predetermined amount of downward movement of said frame relative to the ground;

the closing of said valve member by said actuator causing a pressure increase to occur in said first cylinder body below said first piston thereby causing said pump of said tractor hydraulic system to discontinue the flow of fluid to said lower port of said first hydraulic cylinder.

2. The combination of claim 1 wherein said actuator is spring-loaded to enable said valve member to be moved from its closed position to its open position whenever a sufficient amount of fluid pressure is present in said valve between said first port of said valve and said valve member to overcome the spring-loading of said actuator.

3. The combination of claim 1 wherein said valve support is selectively movably adjustably mounted on the pivotal connection between said first hydraulic cylinder and said frame.

4. The combination of claim 3 further including an adjustment linkage extending between said valve support and the forward end of said implement.

5. The combination of claim 3 wherein said actuator is positioned upon a support which is freely rotatably supported upon the pivotal connection of said first hydraulic cylinder with said frame.

6. In combination with a tractor including a hydraulic system, comprising:

a farm implement hitched to the tractor;

said farm implement including a frame having rearward and forward ends and having at least first and second spaced-apart wheel support assemblies mounted thereon for raising and lowering said frame relative to the ground;

said first wheel support assembly comprising a first support arm having an upper end pivotally secured to said frame about a horizontal axis and a lower end which supports a first ground-engaging wheel thereon;

a first hydraulic cylinder including a first cylinder body having upper and lower ends, a first piston slidably positioned within said first cylinder body, and a first cylinder shaft secured to said first piston and slidably extending from said cylinder body;

said upper end of said first cylinder body of said first hydraulic cylinder being pivotally secured to said frame;

said first cylinder shaft of said first hydraulic cylinder being operatively connected to said first support arm whereby extension of said first cylinder shaft causes said frame to be raised with respect to the ground and whereby retraction of said first cylinder shaft causes said frame to be lowered with respect to the ground;

said first hydraulic cylinder body having an upper fluid port provided therein above said first piston and a lower fluid port provided therein below said first piston;

said second wheel support assembly comprising a second support arm having an upper end pivotally secured to said frame about a horizontal axis and a lower end which supports a second ground-engaging wheel thereon;

a second hydraulic cylinder including a second cylinder body having upper and lower ends, a second piston slidably positioned within said second cylinder body, and a second cylinder shaft secured to said second piston and slidably extending from said second cylinder body;

said upper end of said second cylinder body being pivotally secured to said frame;

said second cylinder shaft being operatively connected to said second support arm whereby extension of said second cylinder shaft causes said frame to be raised with respect to the ground and whereby retraction of said second cylinder shaft causes said frame to be lowered with respect to the ground;

said second hydraulic cylinder body having an upper fluid port provided therein above said second piston and a lower fluid port provided therein below said second piston;

a valve support positioned above said first cylinder body;

a valve mounted on said valve support and having a normally open valve member positioned therein between first and second fluid ports;

said valve member having a plunger secured thereto which extends from said valve;

a first hydraulic conduit extending between said tractor hydraulic system to said lower port of said second hydraulic cylinder;

a second hydraulic conduit extending between said tractor hydraulic system and said first fluid port of said valve;

a third hydraulic conduit extending between said second fluid port of said valve and said upper port of said first hydraulic cylinder;

a fourth hydraulic conduit extending between said lower port of said first hydraulic cylinder and said upper port of said second hydraulic cylinder;

and an actuator at said upper end of said first hydraulic cylinder and being movable therewith for engagement with said plunger of said valve so that said actuator will engage said plunger to close said valve member upon a predetermined amount of retraction of said first cylinder shaft and a predetermined amount of downward movement of said frame relative to the ground;

the closing of said valve member by said actuator causing a pressure increase to occur in said first cylinder body below said first piston thereby causing said tractor hydraulic system to discontinue the flow of fluid to said lower port of said first hydraulic cylinder.

7. The combination of claim 6 wherein said actuator is spring-loaded to enable said valve member to be moved from its closed position to its open position whenever a sufficient amount of fluid pressure is present in said valve between said first port of said valve and said valve member to overcome the spring-loading of said actuator.

8. The combination of claim 6 wherein said valve support is selectively movably adjustably mounted on the pivotal connection between said first hydraulic cylinder and said frame.

9. The combination of claim 8 further including an adjustment linkage extending between said valve support and the forward end of said implement.

10. The combination of claim 8 wherein said actuator is positioned upon a support which is freely rotatably supported upon the pivotal connection of said first hydraulic cylinder with said frame.

11. The combination of claim 8 wherein a laterally extending shaft is secured to said valve support whereby selective rotation of said laterally extending shaft causes said valve support to be selectively moved with respect to said first hydraulic cylinder, an elongated link arm, having forward and rearward ends, operatively secured at its rearward end to said laterally extending shaft whereby selective longitudinal movement of said link arm causes rotation of said laterally extending shaft, an adjustment dial selectively movably mounted on said frame means at the forward end thereof and having the forward end of said link arm pivotally secured thereto whereby selective pivotal movement of said adjustment dial causes selective longitudinal movement of said link arm.

12. In combination with a tractor including a hydraulic system, comprising:

a farm implement hitched to the tractor;

said farm implement including a frame having rearward and forward ends and having at least a first wheel support assembly mounted thereon for raising and lowering said frame relative to the ground;

said first wheel support assembly comprising a first support arm having an upper end pivotally secured to said frame about a horizontal axis and a lower end which supports a first ground-engaging wheel thereon;

a first hydraulic cylinder including a first cylinder body having upper and lower ends, a first piston slidably positioned within said first cylinder body, and a first cylinder shaft secured to said first piston and slidably extending from said cylinder body;

said upper end of said first cylinder body of said first hydraulic cylinder being pivotally secured to said frame;

said first cylinder shaft of said first hydraulic cylinder being operatively connected to said first support arm whereby extension of said first cylinder shaft causes said frame to be raised with respect to the ground and whereby retraction of said first cylinder shaft causes said frame to be lowered with respect to the ground;

said first hydraulic cylinder body having an upper fluid port provided therein above said first piston and a lower fluid port provided therein below said first piston;

a valve support positioned above said first cylinder body;

a valve mounted on said valve support and having a normally open valve member positioned therein between first and second fluid ports;

said valve member having a plunger secured thereto which extends from said valve;

a first hydraulic conduit extending between said tractor hydraulic system to said lower port of said first hydraulic cylinder;

a second hydraulic conduit extending between said tractor hydraulic system and said first fluid port of said valve;

a third hydraulic conduit extending between said second fluid port of said valve and said upper port of said first hydraulic cylinder;

and an actuator at said upper end of said first hydraulic cylinder and being movable therewith for engagement with said plunger of said valve so that said actuator will engage said plunger to close said valve member upon a predetermined amount of retraction of said first cylinder shaft and a predetermined amount of downward movement of said frame relative to the ground;

the closing of said valve member by said actuator causing a pressure increase to occur in said first cylinder body below said first piston thereby causing said tractor hydraulic system to discontinue the flow of fluid to said lower port of said first hydraulic cylinder.

13. The combination of claim 12 wherein said actuator is spring-loaded to enable said valve member to be moved from its closed position to its open position whenever a sufficient amount of fluid pressure is present in said valve between said first port of said valve and said valve member to overcome the spring-loading of said actuator.

14. The combination of claim 12 wherein said valve support is selectively movably adjustably mounted on the pivotal connection between said first hydraulic cylinder and said frame.

15. The combination of claim 14 further including an adjustment linkage extending between said valve support and the forward end of said implement.

16. The combination of claim 14 wherein said actuator is positioned upon a support which is freely rotatably supported upon the pivotal connection of said first hydraulic cylinder with said frame.

17. The combination of claim 14 wherein a laterally extending shaft is secured to said valve support whereby selective rotation of said laterally extending shaft causes said valve support to be selectively moved with respect to said first hydraulic cylinder, an elongated link arm, having forward and rearward ends, operatively secured at its rearward end to said laterally extending shaft whereby selective longitudinal movement of said link arm causes rotation of said laterally extending shaft, an adjustment dial selectively movably mounted on said frame means at the forward end thereof and having the forward end of said link arm pivotally secured thereto whereby selective pivotal movement of said adjustment dial causes selective longitudinal movement of said link arm.

18. A means for controlling the stroke of a hydraulic cylinder, comprising:

a frame;

a rotatable tube mounted on said frame;

a hydraulic cylinder operatively mechanically connected to said rotatable tube, said hydraulic cylinder including a cylinder body having a piston slidably positioned within said cylinder body and a cylinder shaft secured to said piston which extends from said cylinder body; said cylinder body including first and second fluid ports on opposite sides of said piston whereby extension of said cylinder shaft causes said rotatable tube to be rotated in a first direction with respect to said frame and whereby retraction of said cylinder shaft causes said rotatable tube to be rotated in a second direction opposite to said first direction;

an actuator operatively connected to said rotatable tube for movement therewith;

a valve support positioned on said frame;

a valve mounted on said valve support and having a normally open valve member positioned between first and second fluid ports;

said valve member having a plunger secured thereto which extends from said valve;

a source of hydraulic fluid under pressure;

a first hydraulic conduit extending between said source of hydraulic fluid to said second port of said hydraulic cylinder;

a second hydraulic conduit extending between said source of hydraulic fluid and said first fluid port of said valve;

a third hydraulic conduit extending between said second fluid port of said valve and said first fluid port of said hydraulic cylinder;

said actuator engaging said plunger of said valve to close said valve member, upon a predetermined amount of rotation of said rotatable tube, thereby discontinuing the flow of hydraulic fluid through said valve to said hydraulic cylinder.

19. The combination of claim 18 wherein said actuator is spring-loaded to enable said valve member to be moved from its closed position to its open position whenever a sufficient amount of fluid pressure is present in said valve between said first port of said valve and said valve member to overcome the spring-loading of said actuator.

20. The structure of claim 18 wherein said actuator is selectively movably positioned on said rotatable tube.

* * * * *